United States Patent
Pedrazzini-Bertolazzi

(10) Patent No.: US 8,011,262 B2
(45) Date of Patent: Sep. 6, 2011

(54) MULTIPURPOSE COMBINED MACHINE

(76) Inventor: Marino Pedrazzini-Bertolazzi, Madignano (IT)

(*) Notice: Subject to any disclaimer, the term of this patent is extended or adjusted under 35 U.S.C. 154(b) by 804 days.

(21) Appl. No.: 11/993,885

(22) PCT Filed: May 18, 2006

(86) PCT No.: PCT/IB2006/001653
§ 371 (c)(1),
(2), (4) Date: Feb. 8, 2008

(87) PCT Pub. No.: WO2006/136913
PCT Pub. Date: Dec. 28, 2006

(65) Prior Publication Data
US 2008/0202285 A1 Aug. 28, 2008

(30) Foreign Application Priority Data

Jun. 23, 2005 (IT) .................................. CR05A0009
Dec. 21, 2005 (IT) .................................. CR05A0018

(51) Int. Cl.
*F16H 3/08* (2006.01)
*F16H 3/00* (2006.01)
*F16H 37/06* (2006.01)
*B60L 17/28* (2006.01)

(52) U.S. Cl. ..................... 74/331; 74/810.1; 74/665 GA; 180/53.8

(58) Field of Classification Search ............... 74/331, 74/664, 65 F, 404, 361, 665 G, 665 GA, 810.1; 180/53.1, 53.5, 53.8
See application file for complete search history.

(56) References Cited

U.S. PATENT DOCUMENTS

| | | | | | |
|---|---|---|---|---|---|
| 2,923,171 | A | * | 2/1960 | Jedrzykowski | 74/664 |
| 3,554,338 | A | * | 1/1971 | Kennedy, Jr. | 192/48.92 |
| 4,368,048 | A | * | 1/1983 | Wedler | 440/75 |
| 4,441,384 | A | * | 4/1984 | Watson et al. | 74/665 GA |
| 5,159,854 | A | * | 11/1992 | Mino et al. | 74/810.1 |
| 5,279,384 | A | * | 1/1994 | Shibahata et al. | 180/248 |
| 5,385,011 | A | * | 1/1995 | Stewart, Jr. | 60/772 |
| 5,558,173 | A | * | 9/1996 | Sherman | 180/53.8 |
| 6,283,859 | B1 | * | 9/2001 | Carlson et al. | 463/36 |
| 6,484,608 | B1 | * | 11/2002 | Ziavras | 74/810.1 |
| 6,487,924 | B2 | * | 12/2002 | Matsufuji et al. | 74/331 |
| 6,766,714 | B2 | * | 7/2004 | Iwata et al. | 74/606 R |
| 7,389,712 | B2 | * | 6/2008 | Himmelmann | 74/665 B |
| 7,418,888 | B2 | * | 9/2008 | Vialle | 74/665 N |
| 2003/0129065 | A1 | | 7/2003 | Hu | |
| 2006/0037428 | A1 | * | 2/2006 | Klemen et al. | 74/606 R |

FOREIGN PATENT DOCUMENTS

| | | | |
|---|---|---|---|
| GB | 2062135 A | * | 5/1981 |
| GB | 2 073 827 A | | 10/1981 |
| JP | 57-88278 A | | 6/1982 |
| WO | 2004/107534 A1 | | 12/2004 |

* cited by examiner

*Primary Examiner* — Roger Pang
(74) *Attorney, Agent, or Firm* — Young & Thompson

(57) ABSTRACT

A multipurpose combined machine, such as compressor-pump or similar, includes motor elements (M) and a plurality of operating machines (H, C, V) that can be powered in an independent manner by the motor elements, wherein the operating machines are powered through a transmission box (1) having freewheel bearings (5a-5c) and members (S, D) are provided for reversing the rotation direction of the motor elements (M).

16 Claims, 2 Drawing Sheets

MULTIPURPOSE COMBINED MACHINE

The invention relates to the field of operating machines such as pumps, compressors, fans and aspirators for do-it-yourself, maintenance and washing of cars, use in workshops, cleaning also at a professional level, and so on. The invention relates in particular to a multipurpose combined machine, provided with two or more devices, for example a high-pressure pump and an air compressor, powered independently by a single motor.

A known combined machine, from a previous patent of the applicant (WO 2004/107534), comprises two apparatuses, for example a pump and a compressor, powered by a single electric motor, by means of two freewheel bearings. More in detail, the motor is provided with a selector that reverses its rotation direction and the pump and the compressor are connected to the motor shaft respectively by a first and a second freewheel bearing, with an opposite engaging direction. Motion is then transmitted to the pump or the compressor simply by reversing motor rotation.

Another solution proposed by the applicant (WO 2005/101617) is substantially based on the same principle but teaches to modify the electric motor, providing it with two completely independent shafts, each connected to the rotor by means of a freewheel bearing. The shafts are protruding from opposite sides of the motor, which is thus located centrally between the two operating machines; the latter, as in the previous case, may be a pump and a compressor, or a pump and an aspirator, etc. . . .

The disclosed solutions are effective and are adapted both to modify existing machines and to develop specific projects, obtaining very compact items. Nevertheless, there remain some drawbacks that have not yet been overcome.

Assembly of the freewheel bearings, first, requires modification of the machines or the motor. In a piston pump, for example, the bearings can be housed directly in the oscillating wobble plate (if present), or between the pin of the motor and the shaft of the pump, instead of the commonly used rigid tab. In a compressor, the freewheel may constitute the connection between the motor shaft and the stem (or connecting rod) of the piston that compresses the air.

Such modifications are not generally difficult, but interventions must nevertheless be made on a commercial machine, to dismantle and/or modify some parts.

The solution with the freewheels incorporated into the electric motor, between the rotor and the two outlet shafts, may sometimes cause problems of overheating of the bearings and/or of insufficient ventilation.

A limit of the aforementioned embodiments is then that they are well suited for use with electric motors but are less suited to use with combustion engines. The latter may be preferred for professional machines, when significant power and/or independence from the main power supply is required.

Another drawback of above disclosed embodiments is that there are at most two operating machines, and they are always driven at the same rotating speed of the motor.

The object of the invention is to overcome these drawbacks: more in detail, the main objects are: to eliminate the need to modify the motor and/or the operating machines (pump, compressor, etc. . . . ) to fit freewheel bearings; to enable, in principle, the use of any type of electric motor, including sealed motors, and of both a 4-stroke and 2-stroke combustion engine; to drive, by means of a single motor, also two or more machines; to make the speed of the operating machines independent, if necessary, of motor speed.

The objects are achieved with a combined machine, such as compressor-pump or similar, comprising motor means and a plurality of operating machines powered in an independent manner by said motor means, characterised in that:

said combined machine comprises a transmission box, placed between the motor means and said operating machines, that comprises an inlet shaft connected to said motor means and a plurality of outlet shafts connected respectively to said operating machines;

said transmission box comprises at least a freewheel bearing, arranged to drive a respective outlet shaft;

the combined machine furthermore comprises means for reversing the rotation direction given by said motor means to said inlet shaft of the transmission box.

According to an aspect of the invention, the motor means comprises a motor with a reversible rotation direction; preferably an electric motor with a suitable forward/reverse selector, or an internal combustion (i.c.) engine that is able to run in both directions, typically a two-stroke engine.

According to another aspect of the invention, the motor means comprises an engine or motor with a single rotation direction, for example a four-stroke i.c. engine, or an electric motor without the aforementioned selector, and a reversing device of the rotation direction is provided, said device being positioned between the motor and the transmission unit.

Said reversing device substantially enables to selectively reverse the direction of the rotation transmitted by the motor to the inlet shaft of the transmission unit. The reversing device can be of any per se known type, for example mechanical or hydraulic.

According to a further aspect of the invention, the motor means also comprises an electric generator, and preferably comprises an electricity generating group formed by a electric generator and a (two or four-stroke) combustion engine, providing a power source for tools such as a drill, welding unit, etc. . . .

Preferably, the transmission box comprises a plurality of freewheel bearings, arranged for respectively driving each of the outlet shafts.

According to a particularly preferred aspect, the transmission box is geared and comprises freewheel bearings associated directly with some of the transmission gear wheels. More in detail, the freewheel bearings are mounted between the gear wheel and the respective shaft, which may be one of the outlet shafts or an internal secondary shaft.

The transmission unit can also be provided with a clutch on the inlet shaft; said clutch, if provided, is preferably of the magnetic type.

The motor means can also be obtained, for example, with a commercial motor-pump unit.

The invention has multiple advantages. Above all, there is no need of freewheel bearings inserted in the motor or the machines, because the bearings are housed in the appropriate transmission box. As a result, the above disclosed problems such as overheating of the bearings are avoided; no modification of the motor and/or of the machines is necessary for the mounting thereof.

Another important advantage is the possibility of using any electric motor or two or four-stroke i.c. engine. It should be noted that the i.c. engine, and in particular the four-stroke i.c. engine, may be preferable at the semiprofessional or professional level, when significant power and/or independence from the mains power supply are required.

Furthermore, the invention allows a completely free choice of gear ratios, according to the features of the engine and of the machines.

Another advantage is the possibility of coupling even three or more machines to the same motor, creating for example a monobloc pump-compressor-aspirator item.

The features and advantages of the invention will become clearer with the help of the following description and of the attached drawings, in which.

Figure 1:
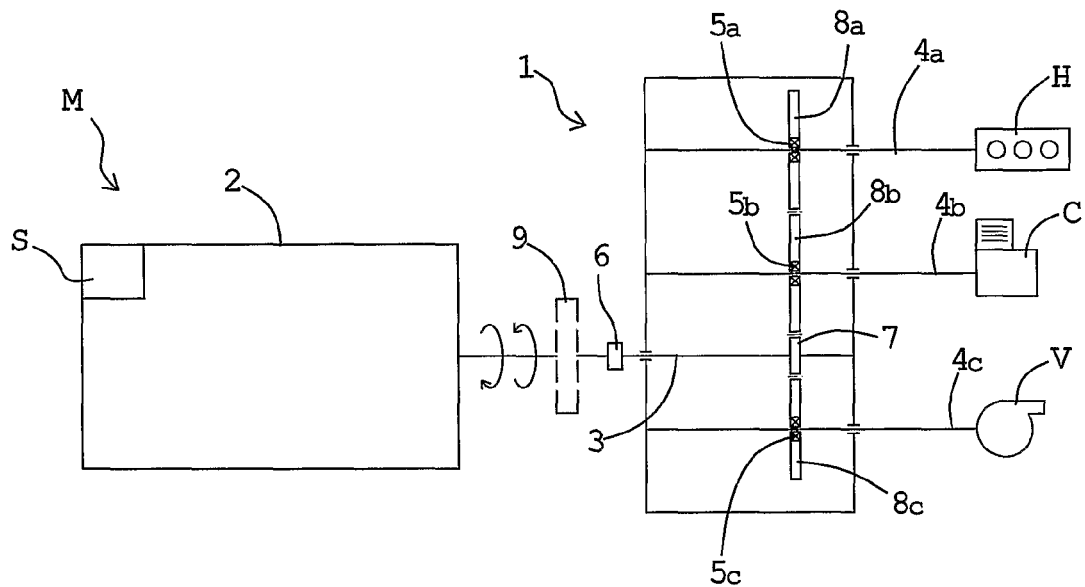
FIG. 1 is a block diagram exemplifying a first embodiment of the invention, relating to a combined machine with a motor with a reversible rotation direction.

Referring now to the drawings, FIG. 1 shows the diagram of a combined machine that, in essential terms, comprises motor means M, a transmission unit (or box) 1, and a plurality of suitable operating machines, for example a high-pressure pump H, a compressor C and a fan V.

The motor means M comprises an electric motor 2 whose rotation direction is reversible through a suitable selector S.

The transmission box 1, basically, has an inlet shaft 3 and a plurality of outlet shafts 4a-4c with respective freewheel bearings 5a-5c. Each of the outlet shafts 4a-4c is driven by the corresponding freewheel bearing 5a-5c, as schematized.

The inlet shaft 3 is connected to the shaft of the motor 2 by a joint 6 or other known connecting means.

The illustrated diagram refers in greater detail to a gear transmission, with a pinion 7 splined on the inlet shaft 3, that drives a series of gear wheels 8a-8c.

The gear wheels 8a-8c are connected to the outlet shafts 4a-4c directly by means of the freewheel bearings 5a-5c. Substantially, each freewheel bearing has an internal ring fixed to the shaft, and an external ring fixed to the gear wheel.

This assembly is advantageous in terms of compactness and simplicity; the gear wheels are always engaged and always rotate during operation but mechanical power is transferred to the outlet shaft only in the engaging direction of the corresponding freewheel; on the other hand the gear wheel rotates "idle" on the shaft thereof.

The transmission unit, in addition to the box 1, may as an option comprise a clutch 9 on the inlet shaft 3, that enables the motor to be "detached". The clutch 9, if provided, is preferably a magnetic clutch.

Many constructional variations are obtainable with known technique application: the box 1 may, for example, comprise a gearing-up or down transmission, and the freewheels can be mounted on secondary shafts rather than directly on the outlet shafts 4a-4c. Further versions, mentioned by way of example, provide planetary gears, or a drive-belt transmission, in which the pulleys—in an equivalent manner to the gear wheels 8a-8c—are mounted on a freewheel.

A simplified embodiment, which nevertheless reaches the purposes of the invention, provides a transmission box in which only some of the outlet shafts, even just one, are driven by means of a respective freewheel. With this embodiment, there are outlet shafts always in motion, to be used for always-on devices, e.g. a cooling fan.

The number of outlet shafts may obviously vary, according to requirements. Also the inlet shafts may be more than one, for connecting a single transmission to several motors.

The gear ratios between the inlet shaft 3 and the outlet shafts 4a-4c are free: in practice the transmission unit may constitute a step-down gear, a step-up gear, or simply have a 1:1 gear ratio; the ratios of the outlet shafts 4a-4c may be the same or different, according to the type of machine or external power shaft that is to be associated with each of outlet shafts 4a-4c.

The freewheel bearings 5a-5c are each mounted with a predetermined engaging direction; as a result, by changing the direction of the motor 2 some of the operating machines are stopped and others are started, depending the rotation direction of the corresponding gear wheel and/or the engaging direction of the freewheel.

It should be noted that the diagram in FIG. 1 provides the reversal of the rotation direction directly at the motor outlet. It is therefore suitable for the use of an electric motor with a rotation selector or, possibly, a two-stroke combustion engine that can be started in both directions.

Figure 2:
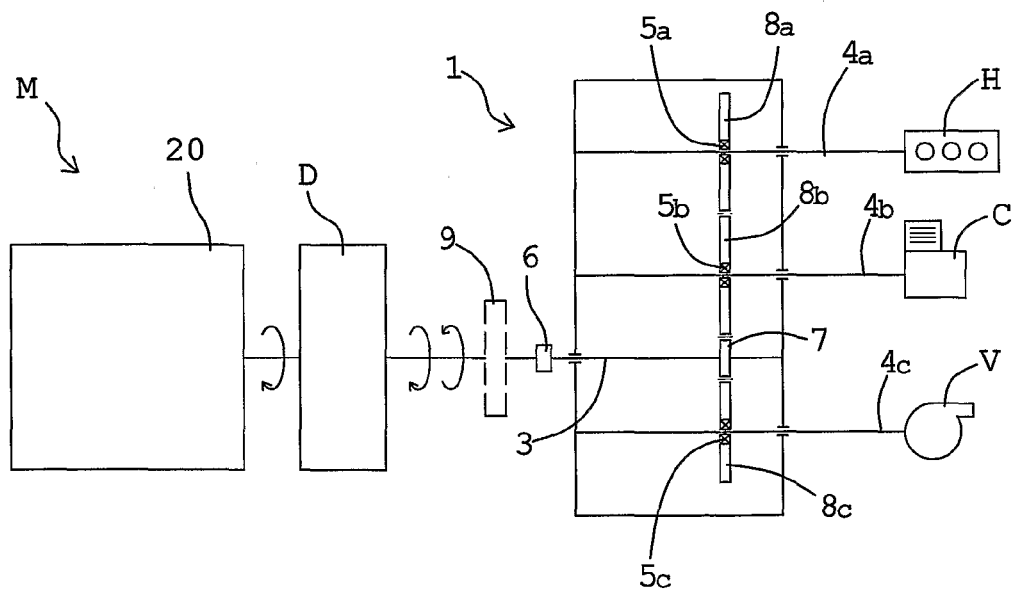
FIG. 2 is a block diagram exemplifying a second embodiment of the invention, relating to a combined machine with an engine with non-reversible rotation direction.

The diagram of FIG. 2, on the other hand, refers to a combined machine powered by a motor 20 with a single rotation direction, for example a four-stroke i.c. engine that, as known, runs in one direction only, due to the non-symmetrical distribution (valve opening and closing).

In this case, a reversing device D is placed at the motor outlet 20 and enables the rotation direction transmitted by said motor 20 to the inlet shaft 3 of the transmission unit 1 to be selectively reversed.

It is understood that, in the latter case, the invention enables a single-rotation direction engine, in particular a four-stroke internal combustion engine, to be used.

The inlet shaft 3 is connected to the motor 20 by means of the reversing device D; through the effect of said reversing device D, therefore, the inlet shaft 3 can rotate in the same direction as the engine 20 or in an opposite direction.

The reversing device D can be of any known type, for example mechanical or hydraulic. Preferably, said reversing device D is a drive of type known as "static direction inverter unit", for example the Sauer Danfoss Series 70 model.

The transmission unit 1, furthermore, has a plurality of outlet shafts 4a-4c, provided with respective freewheel bearings 5a-5c, similarly to the diagram in FIG. 1, that drive the operating machines H, C, and V.

Figure 3:
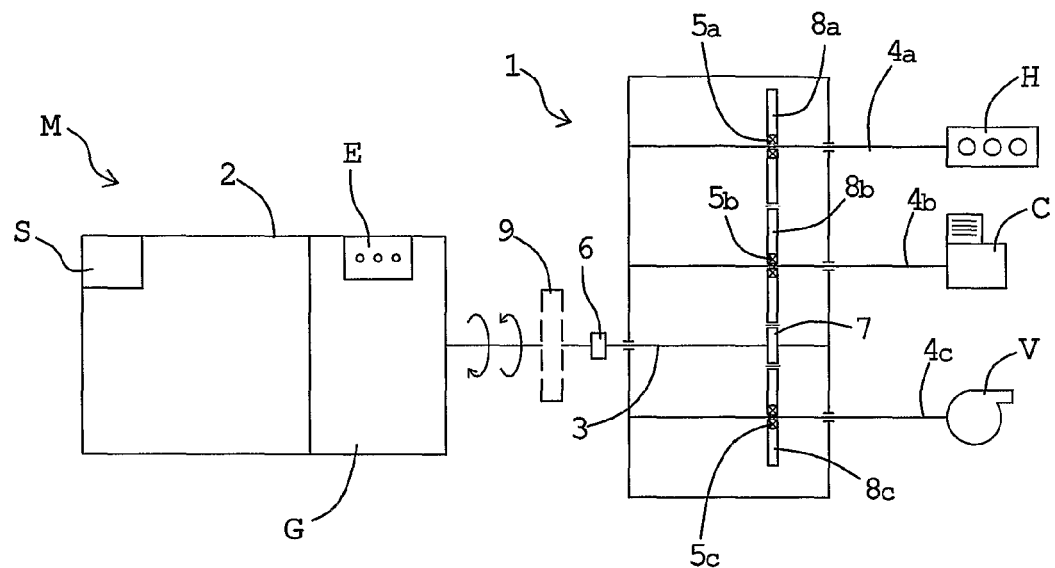
FIGS. 3 and 4 show variations of the diagram in FIG. 1 and, respectively, of the diagram in FIG. 2, in which the combined machine also comprises an electric generator.
Figure 4:
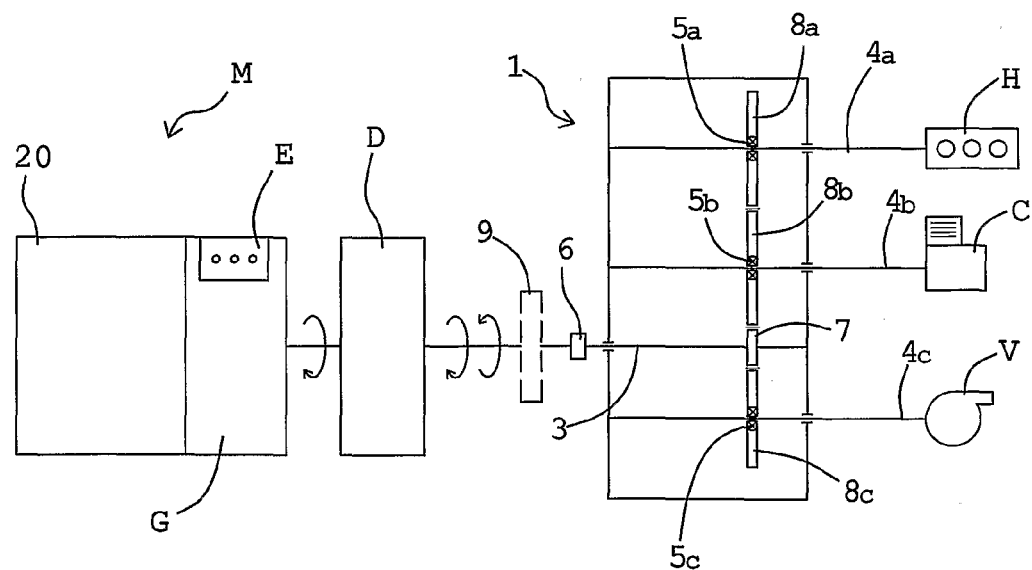

Turning now to FIGS. 3 and 4, two embodiments of the invention are shown that are substantially similar to those of FIGS. 1 and 2, but wherein the motor means M also comprises an electric generator G, driven by the motor 2 (FIG. 3) or 20 (FIG. 4). Said generator G provides at least a power source E that can be exploited for a drill, a welding unit, etc. . . .

By means of the invention, more complex embodiments can lasso be manufactured, for example with a single transmission box provided with several inlet shafts and connected to several motors, or with a motor provided with two power outlets (two shafts or two ends of the same shaft) that drives two transmission boxes of the disclosed type.

The motor means may also consist of a commercially available motor-pump unit (or similar) or motor-generator.

It is clear that the scope of application is not limited to the aforementioned operating machines, but potentially extends to any machine that is usefully drivable by the chosen engine.

The invention claimed is:

1. Combined machine, comprising:
   a motor (M);
   a plurality of operating machines (H, C, V) that can be powered in an independent manner by said motor;
   a transmission box (1), placed between the motor (M) and said operating machines (H, C, V),
   said transmission box comprising i) an inlet shaft (3) connected to said motor (M), ii) a plurality of outlet shafts (4a-4c) connected respectively to said operating machines (H, C, V), and iii) at least a freewheel bearing (5a-5c) arranged to drive a respective outlet shaft (4a-4c), said inlet shaft and said outlet shafts being aligned in the same direction to connect said motor selectively to respective ones of said operating machines; and a reversing device (S, D) for selectively reversing the rotation direction given by said motor (M) to said inlet shaft (3) of the transmission box (1) and thereby selectively inverting the rotational direction of gear wheels.

2. Combined machine according to claim 1, wherein said motor (M) comprises a motor (2) with a reversible rotation direction.

3. Combined machine according to claim 2, wherein the motor (2) is an electric motor with a selector (S) for reversing the rotation direction.

4. Machine according to claim 1, wherein the motor comprises a motor (20) with a single rotation direction, and the reversing device (D) is provided between the motor and the transmission unit (1), said reversing device (D) being suitable for selectively inverting the rotation direction transmitted by said motor to said inlet shaft (3) of the transmission unit (1).

5. Machine according to claim 4, wherein the reversing device (D) is one of mechanical and hydraulic.

6. Combined machine according to claim 4, wherein said motor is a four-stroke internal combustion engine.

7. Machine according to claim 1, wherein the motor (M) comprises an electric generator (G).

8. Machine according to claim 1, wherein the transmission unit (1) further comprises a respective freewheel bearing (5a-5c) for each of the outlet shafts (4a-4c).

9. Machine according to claim 1, wherein the transmission unit (1) is geared, comprising a gear wheel (8a-8c) mounted directly on the freewheel bearing (5a-5c).

10. Machine according to claim 9, wherein said gear wheels (8a-8c) are connected directly on the outlet shafts (4a-4c) by the freewheel bearings (5a-5c).

11. Combined machine according to claim 1, wherein said motor is a four-stroke internal combustion engine.

12. Machine according to claim 1, wherein, changing the direction given by said motor (M) to said inlet shaft (3) stops at least one of the operating machines and starts at least another of the operating machines depending on engaging directions of affected freewheel bearings.

13. Combined machine, comprising:
a motor (M);
a plurality of operating machines (H, C, V) that can be powered in an independent manner by said motor;
a transmission box (1), placed between the motor (M) and said operating machines (H, C, V),
said transmission box comprising i) an inlet shaft (3) connected to said motor (M), ii) a plurality of outlet shafts (4a-4c) configured for connecting respectively to corresponding ones of said operating machines (H, C, V), iii) a freewheel bearing (5a-5c) associated with each outlet shaft, each outlet shaft (4a-4c) driven by a corresponding one of the freewheel bearings, and iv) a plurality of gear wheels (8a-8c) connected to the outlet shafts by the freewheel bearings,
each freewheel bearing having an internal ring fixed to the corresponding outlet shaft and an external ring fixed to the corresponding gear wheel,
said inlet shaft and said outlet shafts aligned in a common direction to connect said motor selectively to respective ones of said operating machines,
in operation, the gear wheels are always engaged and always rotate with mechanical power transferred to the selected outlet shaft only in an engaging direction of the corresponding freewheel bearing, with remaining ones of the gear wheels rotating idle on the respective shafts thereof; and
a reversing device (S, D) for selectively reversing the rotation direction given by said motor (M) to said inlet shaft (3) of the transmission box (1) and thereby selectively inverting the rotational direction of the gear wheels.

14. Machine according to claim 13, wherein, changing the direction given by said motor (M) to said inlet shaft (3) stops at least one of the operating machines and starts at least another of the operating machines depending on engaging directions of affected freewheel bearings.

15. Combined machine, comprising:
a single direction motor;
a plurality of operating machines selectively powered in an independent manner by said motor;
a transmission box, located between the motor (M) and said operating machines,
said transmission box comprising i) an inlet shaft connected to said motor, ii) a plurality of outlet shafts, each outlet shaft configured for connecting respectively to a corresponding one of said operating machines, iii) a freewheel bearing on each outlet shaft, each outlet shaft driven by a corresponding one of the freewheel bearings, and iv) a plurality of gear wheels connected to the outlet shafts by respective ones of the freewheel bearings,
each freewheel bearing having an internal ring fixed to the corresponding outlet shaft and an external ring fixed to a corresponding gear wheel,
said inlet shaft and said outlet shafts aligned in a common direction,
in operation, the gear wheels are always engaged and always rotate with mechanical power transferred to the selected outlet shaft only in an engaging direction of the corresponding freewheel bearing, with remaining ones of the gear wheels rotating idle; and
a reversing device (S, D) for selectively reversing the rotation direction given by said motor (M) to said inlet shaft (3) of the transmission box (1) and thereby selectively inverting the rotational direction of the gear wheels.

16. Machine according to claim 15, wherein, changing the direction given by said motor (M) to said inlet shaft (3) stops at least one of the operating machines and starts at least another of the operating machines depending on engaging directions of affected freewheel bearings.

* * * * *